3,764,317
PHOTOCONDUCTIVE COMPOSITIONS SPECTRALLY SENSITIZED WITH N-SUBSTITUTED 2-AMINOTHIOPHENE DYES
Henri Depoorter, Mortsel, and Felix Jan Moelants, Wilrijk, Belgium, assignors to Agfa-Gevaert N.V., Mortsel, Belgium
No Drawing. Filed Mar. 22, 1972, Ser. No. 236,967
Claims priority, application Great Britain, Apr. 8, 1971, 9,094/71
Int. Cl. G03g 5/06, 5/08
U.S. Cl. 96—1.7        12 Claims

ABSTRACT OF THE DISCLOSURE

A recording material comprising a photoconductive substance is described wherein the said material comprises a spectrally sensitizing dye which comprises in its molecule at least one N-substituted 2-aminothiophene ring. The photoconductive substance may be an inorganic photoconductor or an organic photoconductor.

---

The present invention relates to electrophotography, more particularly to the spectral sensitization of photoconductive compositions, to such spectrally sensitized compositions and to recording materials prepared therewith.

It is known in electrophotography to use photoconductive materials for the recording of electromagnetic radiation patterns in terms of differences in charge density or electroconductivity.

Electrophotographic materials comprising photoconductive substances are known. As photoconductive substance is such coatings specific inorganic as well as organic substances can be used, e.g. sulphur, selenium, and compounds belonging to the classes of the oxides, sulphides, and selenides of zinc, cadmium, mercury, antimony, bismuth, titanium, and lead, anthracene, anthraquinone, certain heterocyclic compounds and many recently discovered organic polymeric as well as non-polymeric photoconductors. In the production of opaque photoconductive layers generally inorganic photoconductive substances are used, whereas for the preparation of transparent photoconductive layers organic photoconductors are used.

The inherent spectral sensitivity of most of the photoconductive compounds is mainly situated in the near U.V.-region of the spectrum. It is possible to increase or extend the spectral sensitivity of electrophotographic recording materials by addition of spectrally sensitizing methine dyes. Spectrally sensitizing dyes have been used extensively in silver halide photography. Many of the dyes proposed for the spectral sensitization of silver halide emulsions, however, are ineffective for use in electrophotography. Moreover, many dyes that have been proposed for the spectral sensitization of inorganic photoconductive substances, e.g. zinc oxide are unsuitable for spectrally sensitizing organic photoconductors.

It has now been found that electrophotographic materials either comprising an inorganic photoconductor or an organic photoconductor can be spectrally sensitized by means of dyes derived from N-substituted 2-aminothiophenes.

The present invention therefore provides a recording material comprising a photoconductive substance, the photosensitivity of which is increased by means of a spectrally sensitizing dye which in its molecule comprises at least one N-substituted 2-aminophene ring.

The spectrally sensitizing dye for use in accordance with the present invention include symmetrical and asymmetrical cyanine dyes, merocyanine dyes, and styryl dyes derived from N-substituted 2-aminothiophenes, which can be represented by the following general Formula I:

(I) 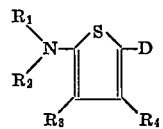

wherein:

each of $R_1$ and $R_2$ stands for $C_1$–$C_5$ alkyl e.g. ethyl or together represent the atoms necessary to complete a heterocyclic 5- or 6-membered ring such as morpholine, piperidine, or pyrrolidine ring,
each of $R_3$ and $R_4$ represents hydrogen, alkyl, substituted alkyl, aryl or substituted aryl, and
D represents (1) 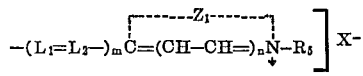

(2) 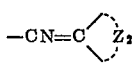

(3) 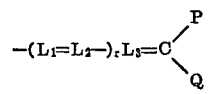

(4) 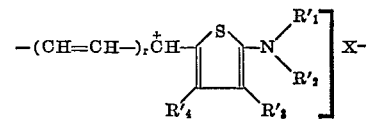

or

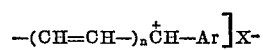

wherein:

each of $L_1$, $L_2$, and $L_3$ represents a methine group or substituted methine group,
$m$ represents 1 or 2,
$n$ represents 0 or 1,
$r$ represents 0, 1, or 2,
$R_5$ represents a substituent of the type contained in cyanine dyes on the cyanine nitrogen atom, e.g. a saturated or unsaturated aliphatic group or an aromatic group e.g. alkyl, substituted alkyl, cycloalkyl, allyl, aralkyl, substituted aralkyl, aryl or substituted aryl; examples of specific groups for $R_5$ are methyl, ethyl, propyl, isopropyl, butyl, β-hydroxyethyl, β-acetoxyethyl, carboxymethyl, and carboxyethyl as described in the German patent specification 704,141, sulphoethyl, sulphopropyl, and sulphobutyl as described in the British patent specification 742,112, sulphatopropyl and sulphatobutyl as described in the French patent specification 1,149,769, the group —ACOOBSO$_2$OH wherein A and B represent a hydrocarbon group as set forth in the British patent specification 886,271, e.g. sulphomethoxycarbonylmethyl, ω-sulphopropoxycarbonylmethyl, ω-sulphobutoxycarbonylmethyl, and p(ω-sulphobutoxycarbonyl)

benzyl, the group —A—W—NH—V—B wherein A represents a methylene group, ethylene group, propylene group, or butylene group, B represents alkyl, amino, or substituted amino and may be hydrogen when V is a single bond, and each of W and V represents a carbonyl group, a sulphonyl group, or a single bond, at least one of W and V being sulphonyl, as set forth in the British patent specification 904,332, e.g. N-(methylsulfonyl)carbamylmethyl, γ-(acetylsulphamyl)-propyl, and δ-acetylsulphamyl)butyl, the group

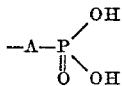

wherein A represents a hydrocarbon group as described in the British patent specification 886,270, cyclohexyl, allyl, benzyl, carboxybenzyl, sulphobenzyl, phenyl and carboxyphenyl, $R_1'$, $R_2'$, $R_3'$, and $R_4'$ have one of the significances given for $R_1$, $R_2$, $R_3$, and $R_4$, $Z_1$ stand for the non-metallic atoms necessary to complete a 5- or 6-membered heterocyclic nucleus containing nitrogen, which nucleus may carry a fused-on benzene or naphthalene ring and further substituents; these heterocycles are of the type known in cyanine dye chemistry and include those of the thiazole series, e.g. thiazole, 4-methylthiazole, 4-phenylthiazole, 5-methylthiazole, 5-phenylthiazole, 4,5-dimethylthiazole, 4,5-diphenylthiazole, 4-(2-thienyl)-thiazole, those of the benzothiazole series, e.g. benzothiazole, 5-chlorobenzothiazole, 5-methylbenzothiazole, 6-methylbenzothiazole, 5,6-dimethylbenzothiazole, 5-bromobenzothiazole, 5-phenylbenzothiazole, 5 - methoxybenzothiazole, 6-methoxybenzothiazole, 4,5,6,7-tetrahydrobenzothiazole, 5,6 - dimethoxybenzothiazole, 5,6 - dioxymethylenebenzothiazole, 5 - hydroxybenzothiazole, 6 - hydroxybenzothiazole, 5 - cyanobenzothiazole, 5 - methoxycarbonylbenzothiazole, 6 - nitrobenzothiazole, 5 - acetylbenzothiazole, 5 - benzoylbenzothiazole, 5 - trifluoromethylbenzothiazole, 5 - trifluoromethylsulphonylbenzothiazole, those of the naphthothiazole series, e.g. naphtho[2,1-d]thiazole, naphtho[1,2-d]thiazole, 5-methoxynaphtho[1,2 - d]thiazole, 5 - ethoxynaptho-[1,2-d]thiazole, 8 - methoxynaphtho[2,1-d]thiazole, 7 - methoxynaphtho[2,1-d]thiazole, those of the thionaphtheno[7,6-d]thiazole series, e.g. 7-methoxythionaphtheno[7,6-d]thiazole, those of the oxazole series, e.g. 4-methyloxazole, 5-methyloxazole, 4-phenyloxazole, 4,5-diphenyloxazole, 4-ethyloxazole, 4,5-dimethyloxazole, 5-phenyloxazole, those of the benzoxazole series, e.g. benzoxazole, 5 - chlorobenzoxazole, 5-methylbenzoxazole, 5 - phenylbenzoxazole, 6 - methylbenzoxazole, 5,6 - dimethylbenzoxazole, 5 - methoxybenzoxazole, 6 - methoxybenzoxazole, 5 - hydroxybenzoxazole, 6-hydroxybenzoxazole, 5 - benzoylbenzoxazole, 5-carboxybenzoxazole, those of the naphthoxazole series, e.g. naphtho[2,1-d]oxazole, naphtho[1,2-d]oxazole, those of the selenazole series, e.g. 4-methylselenazole, 4-phenylselenazole, those of the benzoselenazole series, e.g. benzoselenazole, 5 - chlorobenzoselenazole, 5-methylbenzoselenazole, 5,6 - dimethylbenzoselenazole, 5-methoxybenzoselenazole, 5 - methyl - 6 - methoxybenzoselenazole, 5,6 - dioxymethylenebenzoselenazole, 5 - hydroxybenzoselenazole, 4,5,6,7,-tetrahydrobenzoselenazole, those of the naphthoselenazole series, e.g. naphtho[2,1-d]selenazole, naphtho[1,2-d]selenazole, those of the thiazoline series, e.g. thiazoline, 4-methylthiazoline, 4-hydroxymethyl-4-methylthiazoline, 4,6-bis-hydroxymethylthiazoline, those of the oxazoline series, e.g. oxazoline, those of the selenazoline series, e.g. selenazoline, those of the 2-quinoline series, e.g. quinoline, 6-methylquinoline, 6-chloroquinoline, 6-methoxyquinoline, 6-ethoxyquinoline, 6-hydroxyquinoline, those of the 4-quinoline series, e.g. quinoline, 6-methoxyquinoline, 7 - methylquinoline, 8-methylquinoline, those of the 1-isoquinoline series, e.g. isoquinoline, 3,4-dihydroisoquinoline, those of the 3-isoquinoline series, e.g. isoquinoline, those of the 2-pyridine series, e.g. pyridine, 5-methylpyridine, those of the 3,3-dialkylindolenine series, e.g. 3,3-dimethylindolenine, 3,3-dimethyl-5-chloroindolenine, 3,3,5-trimethylindolenine, 3,3,7-trimethylindolenine, those of the benzimidazole series, e.g. benzimidazole, 5,6-dichlorobenzimidazole, 5-chlorobenzimidazole, 5,6-dibromobenzimidazole, 5-phenylbenzimidazole, 5-fluorobenzimidazole, 5,6-difluorobenzimidazole, 5-cyanobenzimidazole, 5,6-dicyanobenzimidazole, 5 - chloro - 6 - cyanobenzimidazole, 5-fluoro-6-cyanobenzimidazole, 5-acetylbenzimidazole, 5-carboxybenzimidazole, 5-ethoxycarbonylbenzimidazole, 5-sulphamylbenzimidazole, 5 - N - ethylsulphamylbenzimidazole, 5 - ethylsulphonylbenzimidazole, 5-trifluoromethylsulphonylbenzimidazole, etc.

$Z_2$ represents the atoms necessary to close a quaternary 1H-pyrrol-2-yl or 1H-pyrrol-3-yl group including such groups with fused-on aromatic rings such as 1H-indol-2-yl or 1H-indol-3-yl groups and 3-isoindolyl groups, or a quaternary 1- or 3-indolizinyl group, which groups may carry further substituents; the group

can be represented by the formulae:

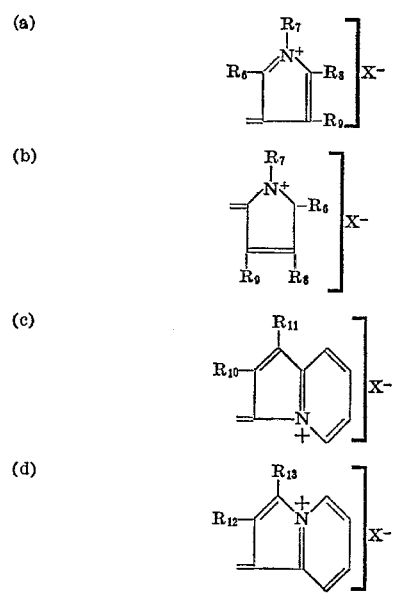

wherein:

each of $R_6$, $R_{10}$, and $R_{12}$ represents aryl, e.g. phenyl and phenyl substituted by alkyl, e.g. methyl and ethyl, aryl, e.g. phenyl, alkoxy, e.g. methoxy and ethoxy, and halogen, e.g. chlorine and bromine, or an aromatic heterocycle, e.g. pyridine, $R_7$ has one of the significances given for $R_6$, each of $R_8$, $R_9$, $R_{11}$, and $R_{13}$ stands for hydrogen, alkyl including substituted alkyl, allyl, cycloalkyl including substituted cycloalkyl, aralkyl including substituted aralkyl, or aryl including substituted aryl; $R_8$ together with $R_9$ may also represent the atoms necessary to complete a fused-on aromatic ring, e.g. benzene, and $X^-$ has the significance given below, each of P and Q stands for an organic group, at least one of which is a negative group such as —CN, $NO_2$, and COOR wherein R is hydrogen or $C_1$–$C_4$ alkyl, or P and Q together represent the atoms necessary to complete a ketomethylene nucleus of the type contained in merocyanine dyes such as those of the pyrazolone series, e.g. 3-methyl-1-phenyl-5-pyrazolone; those of the isoxazolone series, e.g. 3-phenyl-5-isoxazolone or 3-methyl-5-isoxazolone; those of the oxindole series; those of the 2,4,6-triketohexahydropyrimidine series, e.g. barbituric acid or 2-thiobarbituric acid as well as their derivatives such as those substituted in the 1-position and/or 3-position by an alkyl group or an aryl group; those of the rhodanine series (i.e. 2-thio-2,4-thiazolidinedione series), e.g. rhodanine and 3-ethyl-rhodanine, those of the 2-thio-2,4-oxazolidinedione series; those of the 2-thio-2,5-thiazolidinedione series; those of the 2,4-thiazolidinedione series; those of the 2-imino-4-oxazolidinone (i.e. pseudohydantoin) series; those of the 2,4-imidazolinedione(hydantoin) series; those of the 2-thio-2,4-imidazolinedione (i.e. 2-thiohydantoin) series, etc.

Ar stands for aryl including substituted aryl and preferably comprising in the o- or p-position a hydroxyl group, an alkoxy group, an alkylthio group, an amino group or substituted amino group, e.g. the group

wherein each of R' and R'' stands for $C_1$–$C_3$ alkyl, which may be substituted by cyano, carboxyl, sulpho, halogen, e.g. chlorine, alkoxy, alkylthio, alkoxycarbonyl, aryloxycarbonyl, amino, substituted amino, e.g. dimethylamino, —$SO_2R_{10}$, wherein $R_{10}$ represents alkyl, substituted alkyl, e.g. aralkyl, aryl or substituted aryl, and X stands for an anion of the type contained in cyanine dye salts, e.g. chloride, bromide, iodide, perchlorate, benzene sulphonate, toluene sulphonate, methyl sulphate, ethyl sulphate, etc.; the nature of the anion is of no or practically no significance for the effectiveness of the sensitizer, and X does not exist when the molecule itself contains an anionic group in which case the dye is a betaine dye.

By appropriate choice of the substituents and methine chain length, the characteristics of the sensitizers of the invention as regards sensitizing range, solubility, etc. can be adapted to the necessities.

The following list includes representative examples of methine dyes corresponding to the above general formula. These dyes were found to be particularly suitable for the spectral sensitization of electrophotographic material.

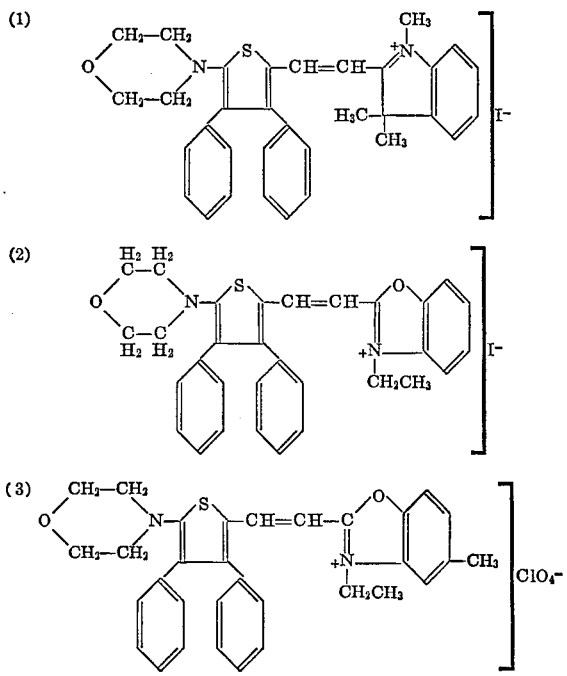

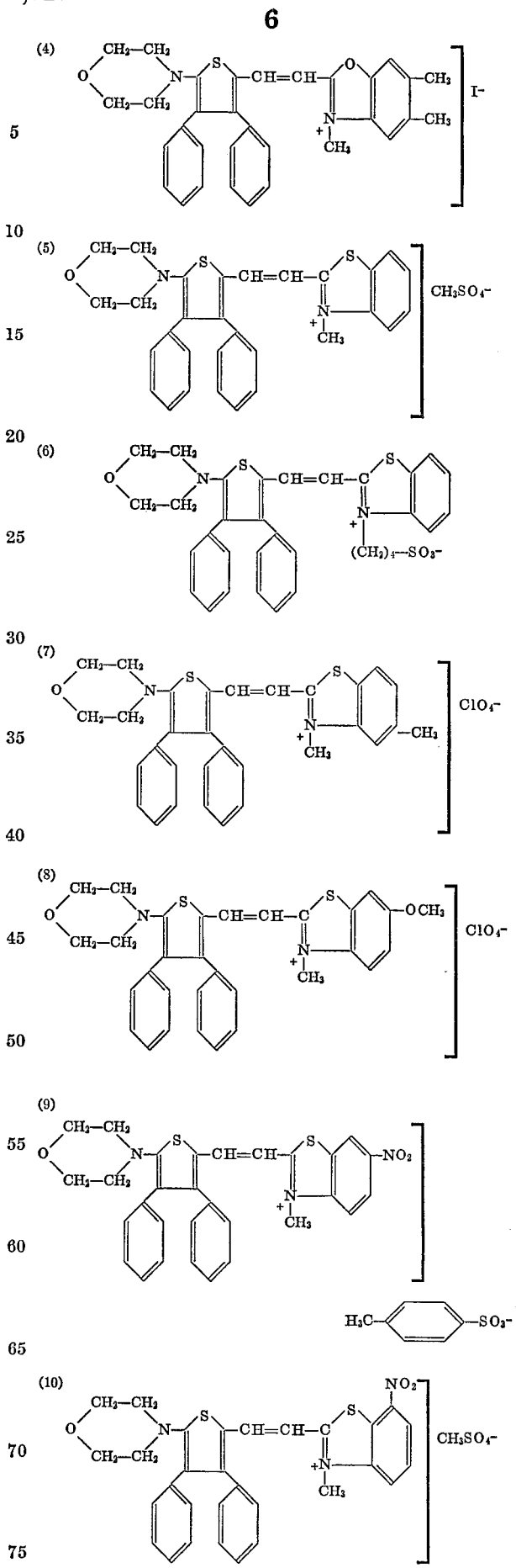

(11) 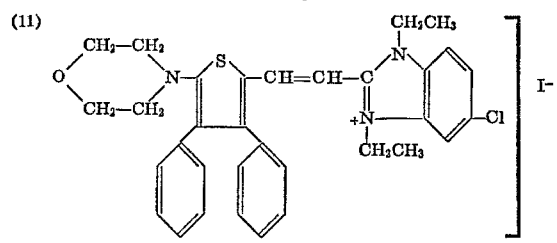
(12) 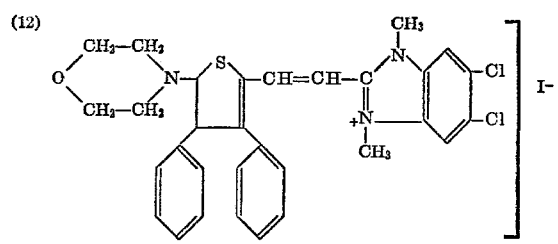
(13) 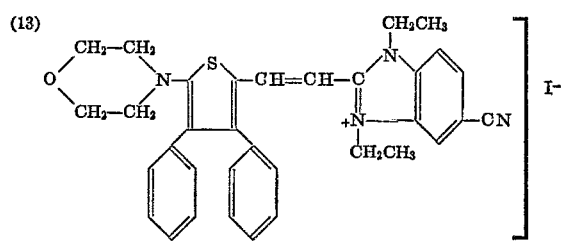
(14) 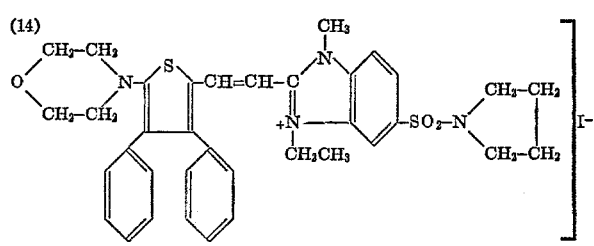
(15) 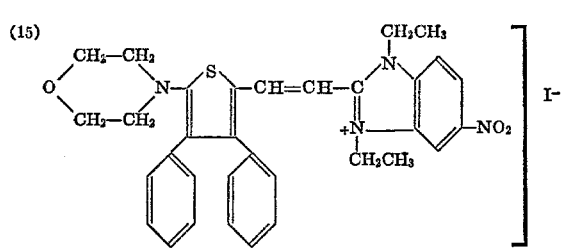
(16) 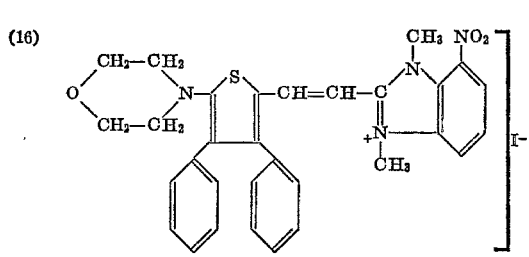
(17) 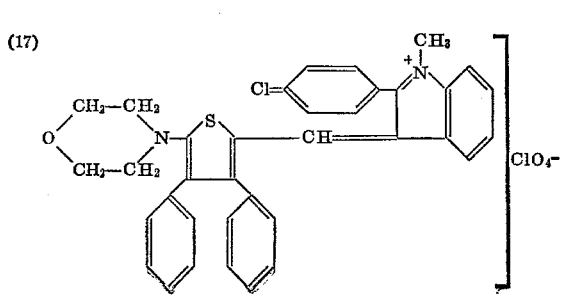
(18) 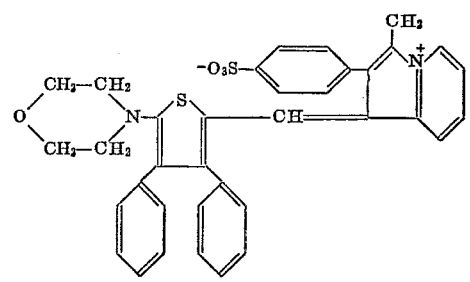
(19) 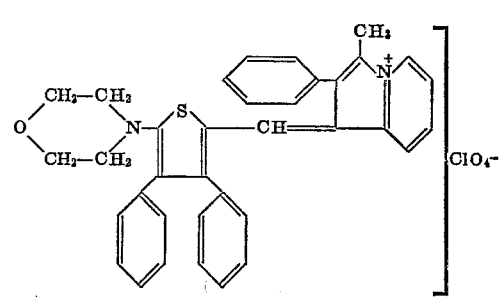
(20) 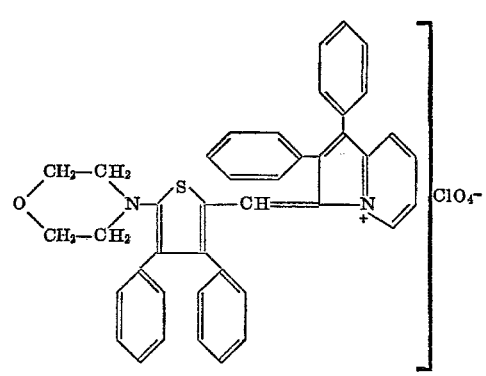
(21) 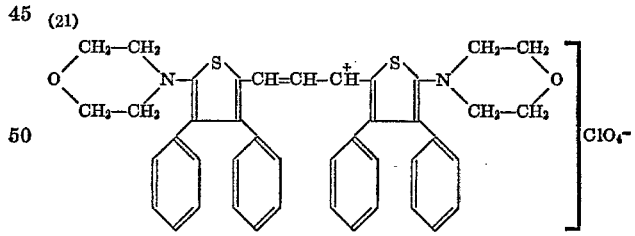
(22) 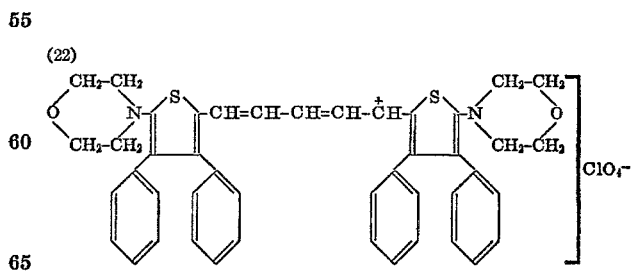
(23) 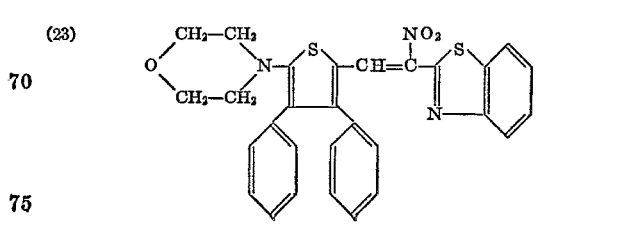

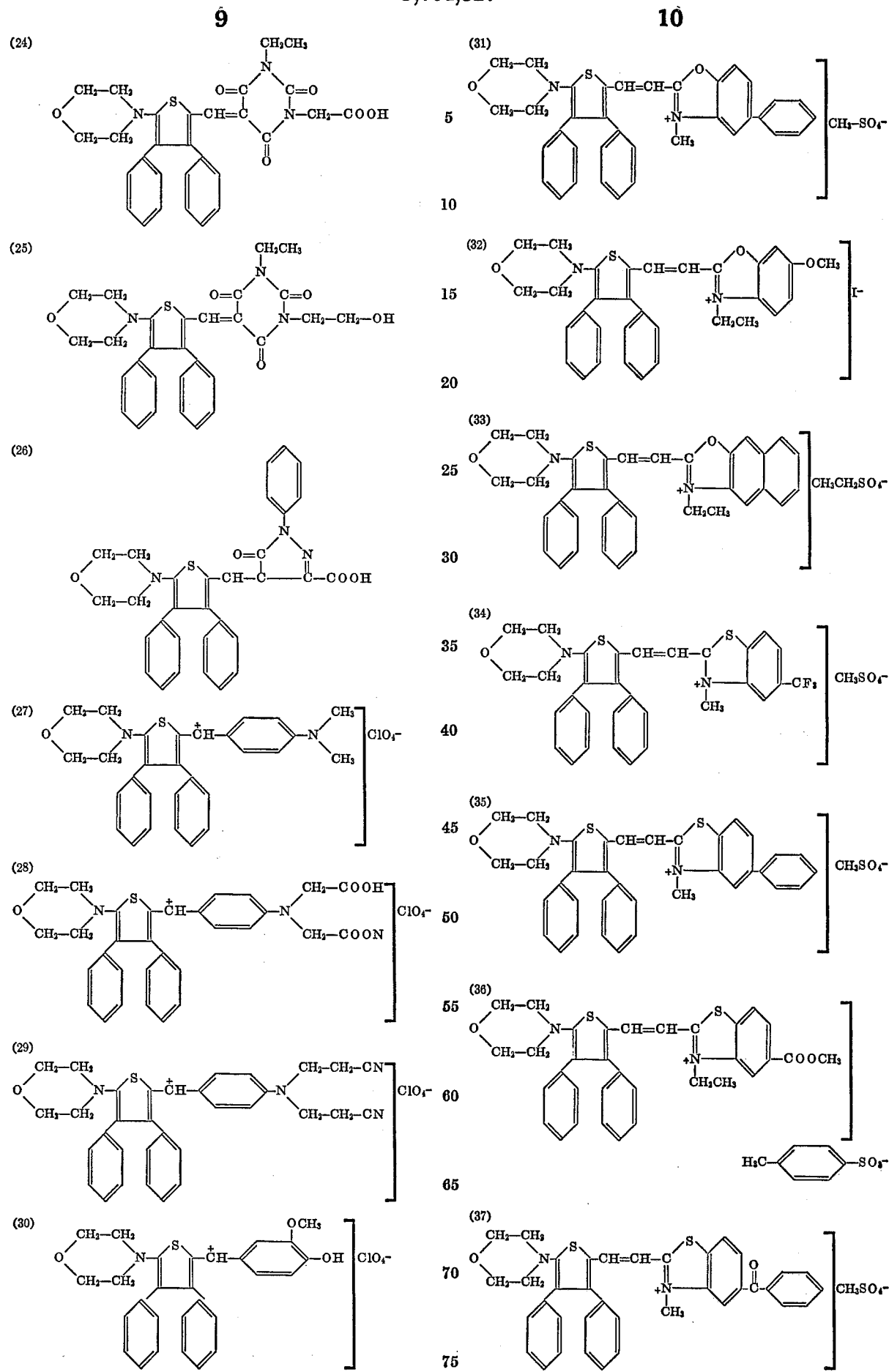

(38) 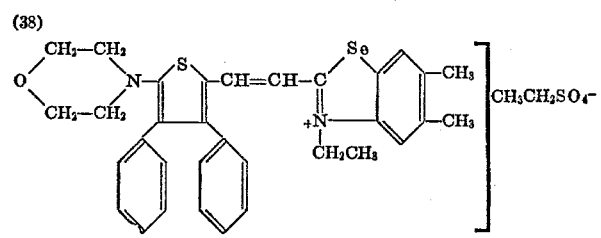
(39) 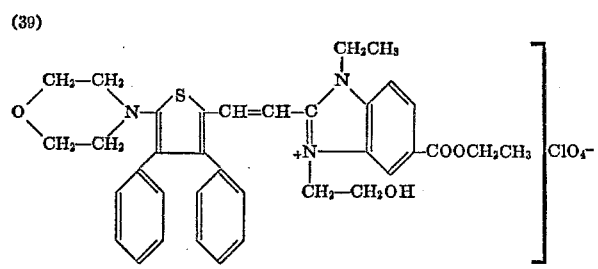
(40) 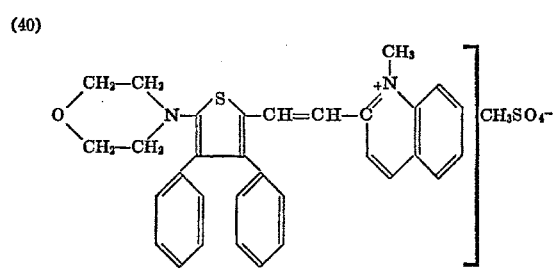
(41) 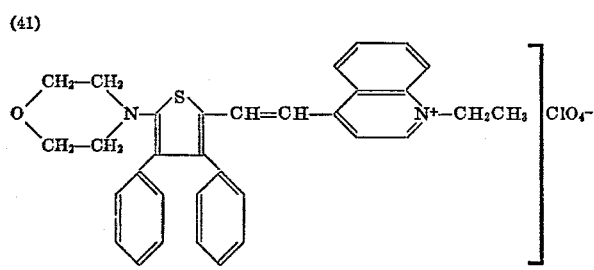
(42) 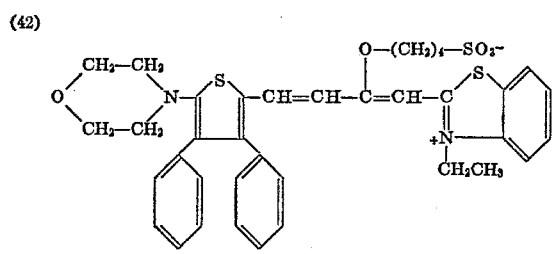
(43) 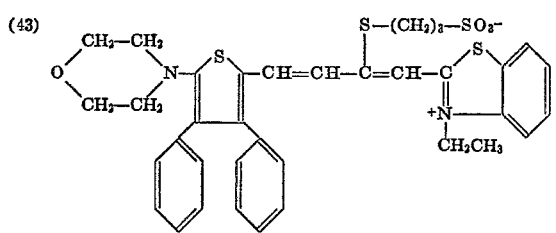
(44) 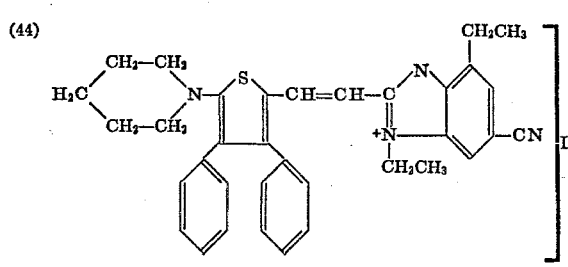
(45) 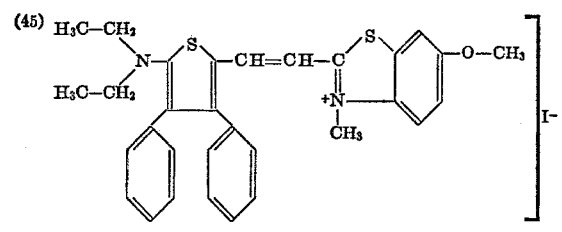
(46) 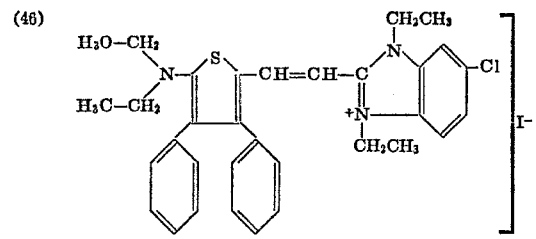
(47) 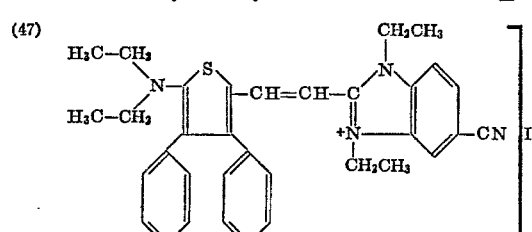
(48) 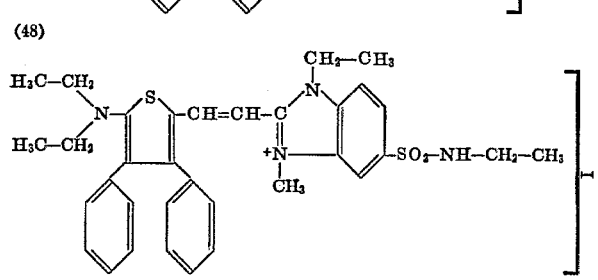
(49) 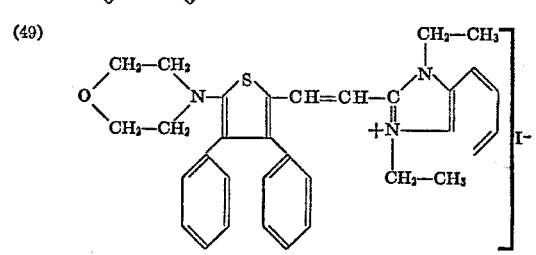
(50) 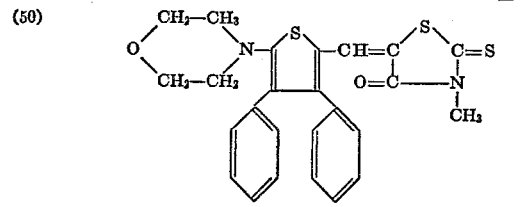
(51) 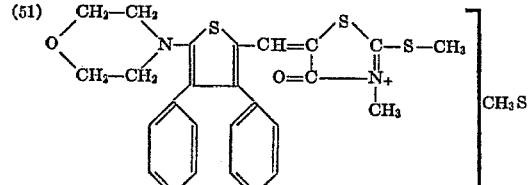
(52) 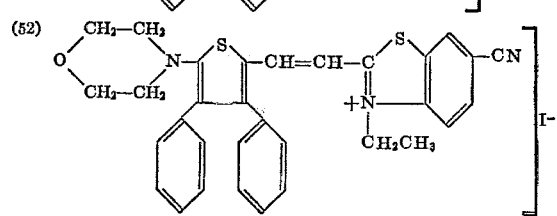

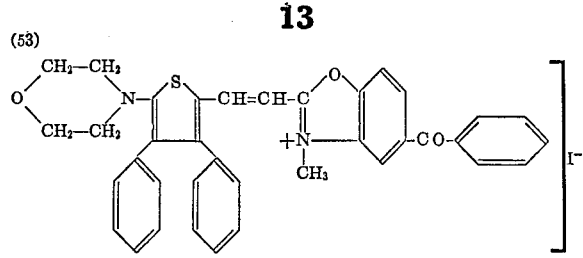
(53)

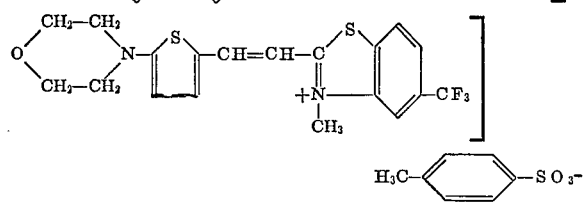
(54)

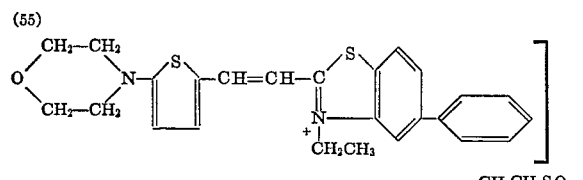
(55)

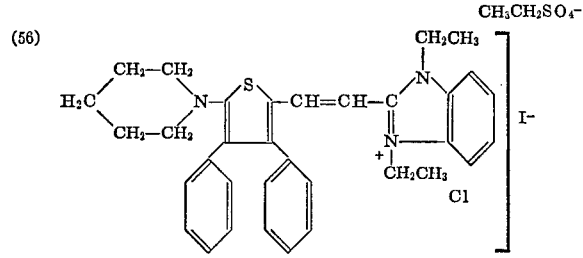
(56)

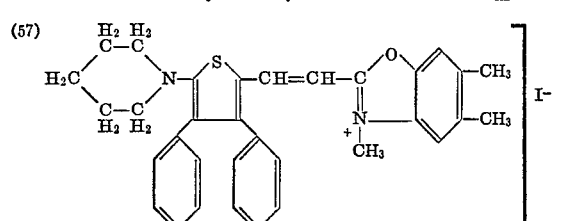
(57)

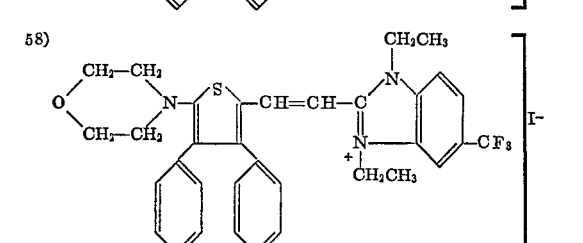
(58)

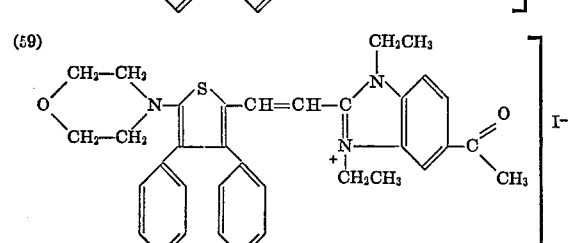
(59)

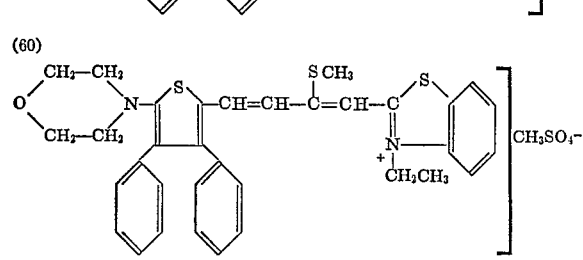
(60)

The novel dyes corresponding to general Formula I, wherein D has significance (1) can be prepared by condensing a thiophene compound corresponding to the following general Formula II:

(II) 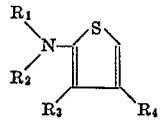

wherein:

$R_1$, $R_2$, $R_3$, and $R_4$ have the same significance as above, with a compound corresponding to one of the following general formulae:

(III) 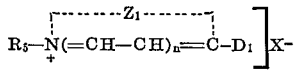

(IV) 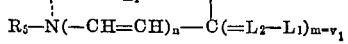

wherein:

$R_5$, $Z_1$, X, $L_1$, $L_2$, $n$, and $m$ have the same significance as above, $D_1$ stands for β-arylaminovinyl, δ-arylamino-1,3-butadienyl, β-alkylmercaptovinyl, β-arylmercaptovinyl, β-acetarylidovinyl, β-p-tolusulphoarylidovinyl, chlorovinyl, or alkoxyvinyl, which vinyl groups may carry a substituent, and $V_1$ stands for oxygen, sulphur, selenium, or =N—R wherein R is aryl, eg., phenylimino.

These condensations are carried out advantageously in an acid anhydride such as acetic anhydride or in an inert diluent, such as methanol, ethanol, methoxyethanol, acetone, acetonitrile, dimethylsulphoxide, etc. in the presence of a basic condensing agent.

The novel dyes of Formula I wherein D has meaning (1) can also be prepared by condensing a compound of the following general formula:

(V) 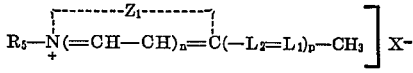

wherein:

$R_5$, $Z_1$, $L_2$, $L_1$, X, and $n$ have the same significance as above, and $p$ stands for 0 or 1, with a compound of the following general formula:

(VI) 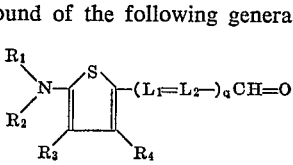

wherein:

$R_1$, $R_2$, $R_3$, $R_4$, $L_1$, and $L_2$ have the same significance as above, and $q$ is 0 or 1 but is 0 when $p$ is 1.

These condensations can be carried out by heating a mixture of Compounds V and VI in the presence of an acid anhydride such as acetic anhydride. The reaction can be carried out also in an inert diluent such as methanol, ethanol, ethylene glycol monomethyl ether, acetonitrile, dimethyl sulphoxide, tetrahydrothiophene-1,1-dioxide or dimethylformamide, in the presence of a basic condensing agent.

The intermediates of Formula VI with $q=0$ can be prepared from the corresponding thiophene compound of Formula II by a Vilsmeier and Haack reaction with dimethylformamide as formylating agent as described by Hartmann, J. Prakt. Chem. [4], 36, 50 (1967), whereas the intermediates of Formula VI with $q=1$ can be prepared analogously with N-methylanilino-propene(1)-al(3) instead of dimethylformamide.

The novel dyes corresponding to the above general Formula I wherein D has significance (2) can be prepared by condensing in the presence of an acid a compound of general Formula VI wherein $q=0$ with a compound of the following general formula:

(VII) 

wherein:

$Z_2$ has the same significance as above, or by condensing in the presence of an acid a compound of general Formula II with a compound of the following general formula:

(VIII) 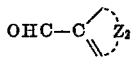

wherein $Z_2$ has the same significance as above.

The aldehyde of Formula VIII can also be prepared according to the Vilsmeier and Haack reaction as referred to above.

The preparation of dyes corresponding to the above general Formula I wherein D has significance (1) or (2) has been illustrated in the co-pending U.K. patent application No. 9,095/71 filed on even date for "Spectral sensitization of direct-positive silver halide emulsions."

The novel merocyanine dyes corresponding to the above general Formula I wherein D has significance (3) can be prepared by condensing a compound of Formula II with a compound represented by the following Formula IX.

(IX) 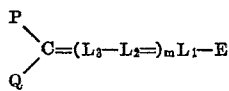

wherein:

P, Q, $m$, $L_1$, $L_2$, and $L_3$ have the same significance as above, and

E stands for a halogen atom such as chlorine, bromine, and iodine, an alkylmercapto or arylmercapto group, an alkoxy group, an arylamino group, an acetarylido group, a p-tolusulpharylido group, etc.

The merocyanine dyes of the above general Formula I wherein D has significance (3) can also be prepared by condensing an aldehyde of Formula VI with a compound of one of the following general formulae:

(Xa) 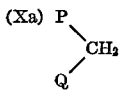  (Xb) 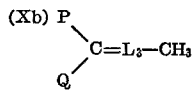

wherein:

P, Q, and $L_3$ have the same significance as defined above.

The following preparation illustrates how the novel merocyanine dyes of the invention can be prepared.

Preparation 1: Dye 26

A mixture of 2-morpholino-3,4-diphenyl-5-formyl-thiophene (3.5 g.—0.01 mole), 1-phenyl-3-carboxy-5-pyrazolone (2.1 g.—0.01 mole), and methoxyethanol (30 ml.) was refluxed for ½ hour and allowed to cool overnight. The precipitate was filtered off by suction and dried. Yield: 3.7 g. Melting point: above 260° C. Abs. max.: 536 nm. $\epsilon=4.7\times10^4$ (measured in methanol).

The dyes of general Formula I wherein D has significance (4) or (5) can be prepared according to the methods described by Hartmann, J. Prakt. Chem. [4], 36, 50 (1967). The following preparation illustrates how the styryl dyes can be prepared.

Preparation 2: Dye 28

A mixture of 2-morpholino-3,4-diphenylthiophene (3.2 g.—0.01 mole) 4-[bis(carboxymethyl)amino]benzaldehyde (3.6 g.—0.015 mole), methanol (50 ml.), and perchloric acid 76% (2.2 ml.—0.025 mole) was refluxed for 1 hour and allowed to cool overnight. The precipitate was filtered off by suction. Yield: 6.2 g. Melting point: above 260° C. Absorption maximum: 573 nm. $\epsilon=3.4\times10^4$ (measured in methylene chloride).

The dyes corresponding to the above general formula are useful for spectrally sensitizing inorganic photoconductors, e.g. zinc oxide as well as organic photoconductive compounds, e.g. those described in the cognate copending U.K. patent applications 15,333/69 and 42,061/69 and in the copending U.K. patent application 59,094/70.

The optimum amount of spectrally sensitizing dye to be added to the photoconductor can be easily established by simple experiments. It depends on the nature of the sensitizer and photoconductor employed and is generally comprised between 0.01 mg. and 5 mg. per gram of inorganic photoconductor and between 0.1 mg. and 100 mg. per gram of organic photoconductor.

In order to form a recording layer with sufficient mechanical strength the photoconductors are used in combination with macromolecular binding agents that are photoconductive or not.

Macromolecular compounds suitable for use as binding agent for the photoconductors are, e.g. natural resins such as dammar resin, gum arabic, microcrystalline waxes, modified natural substances such as cellulose diacetate, cellulose triacetate and ethylcellulose, or other cellulose derivatives, pentaerythrite polyesters or modified colophony resins and ester gums, polymerisates such as polyethylene, polystyrene and copolymers of styrene, polyvinyl acetate and copolymers of vinyl acetate, polyvinyl acetals of formaldehyde, acetaldehyde or butyraldehyde, polyacrylic acid esters and polymethacrylic acid esters and coumarine-indene resins, and polycondensates such as glycerol-phthalate resins and other glyceryl polyesters, alkyd resins, polyethylene glycol esters, diethylene glycol polyesters, formaldehyde resins and silicone resins. Other suitable binding agents are listed in the cognate copending U.K. patent applications 15,333/69 and 42,061/69.

If desired one or more suitable plasticizers such as dibutyl phthalate, dimethyl phthalate, dimethylglycol phthalate, tricresyl phosphate, triphenyl phosphate, monocresyl diphenyl phosphate, etc. in quantities amounting from 10 to 30% by weight relative to the amount of binding agent used can be added to the compositions for the formation of the photoconductive layers.

Film-forming polymeric photoconductive substances can be applied without binding agent whereby it is possible to produce very smooth and transparent photoconductive layers and even self-supporting sheets.

For the preparation of an electrophotographic material according to the present invention various techniques can be applied.

Inorganic photoconductor layers, e.g. zinc oxide layers can be applied either from organic solvents and binding agents soluble in the organic medium as described, e.g. in Belgian Pats. 612,102 and 714,257 or from an aqueous medium as described in British Pats. 1,125,579 and 1,125,580. The spectral sensitizers are added preferably in dissolved state, e.g. dissolved in a water-miscible solvent or in water to the dispersion of the inorganic photoconductive substance. When they should be added to an aqueous dispersion of inorganic photoconductor they are preferably incorporated from an organic liquid consisting of or containing a solvent, that has a very low vapour pressure and is for at least 20% by weight soluble in water at 20° C. Such a method for sensitizing an inorganic photoconductive material is described in the United Kingdom patent specification 1,154,613.

Organic photoconductors are preferably dissolved or dispersed first in a suitable organic solvent such as ketones, e.g. acetone, chlorinated hydrocarbons, e.g. methylene chloride, trichloroethylene, aliphatic esters, e.g. ethyl acetate, benzene, dioxan, dimethylformamide, or other organic solvents, or in mixtures of such solvents. The sensitizers and possibly also the other additives are added thereto.

The photoconductive recording layers containing a spectrally sensitizing dye as described above may contain in addition to the photoconductive substance(s) and the binder (if any), spectral sensitizers of any other type, compounds increasing the dark-resistivity, agents counteracting the fringe effect, matting agents, fluorescing compounds, phosphors, optical brightening agents, agents controlling the adhesive power of the recording layer, agents controlling the elasticity, the plasticity, and the hardness of the recording layer, agents controlling the viscosity of the coating compositions, antioxidants, gloss-improving agents, etc. When selecting any additives, one should give preference to those, which least reduce the dark-resistivity of the photoconductive layer.

The photoconductive composition sensitized according to the present invention may be coated on a support according to a known coating technique, e.g. by spraying, whirling, dip-coating, or by a coating technique, wherein use is made of a doctor blade. The thickness of the photoconductive layers is not critical, but is open to choice within a wide range depending on the requirements in each individual case. Good results are attained with photoconductive layers of a thickness between 1 and $20\mu$ preferably between 3 and $10\mu$. Layers, that are too thin do not have a sufficient insulating power and layers that are too thick may possess undesirable mechanical properties and require extensive exposure times.

In the manufacture of widely applicable electrophotographic recording materials according to the present invention a relatively conductive support for the recording layer is used, e.g. an electroconductive sheet or plate, or an insulating sheet or plate covered with an electroconductive interlayer. By electroconductive plate or sheet there is understood a plate or sheet, whose specific resistivity is lower than that of the nonirradiated photoconductive layer, i.e. in general lower than $10^9$ ohm cm. Supports whose specific electrical resistivity is lower than $10^7$ ohm cm. are preferred.

Suitable conductive plates are, e.g. plates of metals such as aluminium, zinc, copper, tin, iron, or lead.

Suitable electroconductive interlayers for insulating supports are, e.g. vacuum-coated metal layers such as silver or aluminium layers, transparent conductive polymer layers, e.g. applied from polymers containing quaternized nitrogen atoms, such as those described in the United Kingdom patent specification 950,960 or layers containing dispersed in a binder conductive particles, e.g. carbon black and metal particles. The binder used for said particles has preferably a specific resitivity lower than $10^6$ ohm cm. A suitable binder for that purpose is gelatin.

It is possible to produce transparent photoconductive recording materials by applying an organic photoconductive substance from a clear solution onto a conductive transparent base or a transparent insulating base coated with an electroconductive transparent interlayer.

As transparent bases resin sheets having an optical density of not more than 0.10 are preferred, e.g. a sheet made of polyethylene terephthalate or cellulose triacetate. The conductive interlayer preferably consists of a metal coating, e.g. a vacuum-coated aluminium layer having an optical density of not more than 0.30 or of a conductive transparent polymer layer, e.g. composed of an organic polyionic polymer, e.g. a polymer containing quaternized nitrogen atoms such as a quaternized polyethylene imine.

In reproduction techniques wherein the prints are to be produced on an opaque background a paper sheet is used preferably as a support for the recording layer.

Paper sheets having an insufficient electroconductivity are coated or impregnated with substances that enhance their conductivity, e.g. by means of a conductive overcoat such as a metal sheet laminated thereto.

Substances suited for enhancing the conductivity of a paper sheet and that can be applied in the paper mass are hygroscopic compounds and antistatic agents as described, e.g. in the United Kingdom patent specification 964,877 and antistatic agents of polyionic type, e.g. Calgon Conductive polymer 261 (registered trademark of Calgon Corporation, Inc., Pittsburgh, Pa., U.S.A.) for a solution containing 39% by weight of active conductive solids and which contain a conductive polymer having the following recurring units:

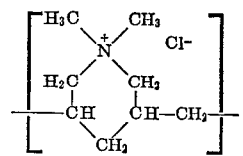

Paper sheets are preferably impermeabilized for organic solvents, e.g. by means of a water-soluble colloid or by strong hydration of the cellulose fibers such as in glassine paper.

Electrophotographic materials sensitized according to the present invention can be used in any of the different techniques known in recording with the aid of photoconductors. Thus, they can be used in a technique based on the discharge of an electrostatically charged recording layer by exposure to light.

The electrostatic charging of the photoconductive layer can be effected according to any of the methods known in electrophotography, e.g. by corona discharge.

The conversion of the electrostatic latent image produced by exposure of the electrostatically charged recording layer, into a visible image can occur according to one of the techniques known in electrophotography, wherein use is made of the electrostatic attraction or repulsion of finely divided coloured substances, which are present in, e.g. a powder mixture or an electric insulating liquid (e.g. in the form of an aerosol), or wherein electrostatic attraction is used for selectively wetting charged protions of the recording layer, as described in the United Kingdom patent specifications 1,020,505 and 1,033,419.

Evidently, the present invention is by no means limited to one or the other particular embodiment as regards the use of the sensitized electrophotographic materials, the exposure technique, the charging method, the developing method, and the fixing. The methods as well as the materials used in these methods can be adapted to the necessities.

The following examples illustrate the present invention.

EXAMPLE 1

A mixture is made of photoconductive zinc oxide—20 g.
toluene—20 ml.
ethylacetate—11 ml.
10% solution of tetrachlorophthalic anhydride in ethanol—0.66 ml.
50% solution of co(vinyl acetate/ethyl acrylate/acrylic acid) (percent by weight: 87/12/1) in a mixture of toluene, 1,2-dichloroethane, and ethylacetate (vol. percent 1:1:4)—4.5 g.

The composition was sensitized by addition of one of the sensitizing dyes listed in the table below. Each sensitizing dye was added in an amount of 0.5 mg. per gram of zinc oxide in the form of a 0.1% solution in dimethylformamide and was intimately mixed with the ground composition.

The compositions were coated on a baryta paper weighing 90 g./sq. m. pro rata of 25 g. of zinc oxide per sq. m.

After having been dried, the layers were charged, exposed for 15 sec. with an irradiation intensity of 2280 lux by means of an incandescent lamp of 450-watt through a step wedge having a constant of 0.1.

The differently sensitized layers were developed electrophoretically. The sensitivity of the recording layers obtained is expressed by the number of steps corresponding with the discharged areas on which no developing particles are deposited, which areas thus kept the original density of the recording layer. The higher the number, the more sensitive the layer.

TABLE

| Spectrally sensitizing dye added | Sensitization maximum (nm.) | Sensitivity (number of nonblackened areas) |
|---|---|---|
|  |  | 9 |
| 1 | 588 | 29 |
| 2 | 558 | 24 |
| 3 | 560 | 25 |
| 4 | 560 | 25 |
| 5 | 590 | 28 |
| 6 | 596 | 31 |
| 7 | 592 | 28 |
| 8 | 592 | 28 |
| 9 | 617 | 28 |
| 10 | 610 | 27 |
| 11 | 470 | 20 |
| 12 | 474 | 20 |
| 13 | 494 | 22 |
| 14 | 486 | 20 |
| 15 | 520 | 22 |
| 16 | 506 | 20 |
| 17 | 546 | 20 |
| 18 | 586 | 28 |
| 19 | 592 | 24 |
| 20 | 634 | 24 |
| 21 | 460 | 32 |
| 22 | 470 | 32 |
| 23 | 566 | 19 |
| 24 | 500 | 24 |
| 25 | 500 | 19 |
| 27 | 615 | 31 |
| 28 | 587 | 26 |
| 29 | 566 | 21 |
| 30 | 607 | 23 |
| 31 | 564 | 24 |
| 32 | 562 | 26 |
| 33 | 570 | 26 |
| 34 | 594 | 25 |
| 35 | 600 | 26 |
| 36 | 596 | 26 |
| 37 | 598 | 28 |
| 38 | 600 | 28 |
| 39 | 484 | 20 |
| 40 | 590 | 27 |
| 41 | 600 | 26 |
| 42 | 560 | 28 |
| 43 | 630 | 30 |
| 44 | 536 | 24 |
| 45 | 600 | 25 |
| 46 | 524 | 19 |
| 47 | 548 | 21 |
| 48 | 536 | 20 |

EXAMPLE 2

A solution of 4 g. of 1-ethyl-3-phenyl-7-diethylamino-2-(1H)-quinolone in a mixture of 50 ml. of methylene chloride was added to a 5% solution of copoly(vinylchloride/vinyl acetate) maleic anhydride in acetone. A sample of this unsensitized photoconductor composition was coated pro rata of 2 g. of photoconductor per sq. m. on a sheet of aluminium foil laminated to a paper support.

Other samples of the unsensitized coating composition were sensitized by addition of 0.05 g. of the sensitizing dyes listed in the table below and coated in the same way as the unsensitized sample.

Each of the coated samples was negatively charged with a negative corona having a potential difference of −6000 v. between the corona wires and the ground and then exposed for 15 sec. with 2000 lux emitted by an incandescent lamp placed at a distance of 25 cm. through a step wedge having a constant of 0.20.

The latent wedge images were developed electrophoretically by means of an electrophoretic developer obtained by diluting the concentrated developer composition described hereinafter in a volume ratio of $15/1000$ with the hydrocarbon solvent Shellsol T (trade name):

Carbon black (average particles size: 20 m$\mu$)—30 g.
Zinc monotridecyl phosphate—1.5 g.
Shellsol T (trade name)—750 ml.
resin binder solution prepared as described hereinafter 150 g.

The resin binder solution was prepared by heating 500 g. of Alkydal L 67 (trade name of Farbenfabriken Bayer A.G., Leverkusen, Germany for an alkyd resin modified with linseed oil) (67% by weight) and 500 ml. of white spirit containing 11% by weight of aromatic compounds to 60° C. till a clear solution was obtained, and subsequent cooling.

Relative speed values of the developed samples were calculated by comparison of the number of visible steps in the wedge images obtained in the sensitized photoconductor materials with the number of visible steps produced in the unsensitized coating to which a relative speed of 100 is given. The visible steps are the areas of the wedge image that correspond with the discharged areas on exposure.

TABLE

| Sensitizing dye added: | Relative speed |
|---|---|
| — | 100 |
| 1 | 2500 |
| 2 | 2500 |
| 4 | 2500 |
| 5 | 2500 |
| 6 | 2500 |
| 7 | 2500 |
| 8 | 2500 |
| 9 | 2500 |
| 10 | 1600 |
| 13 | 2500 |
| 15 | 1600 |
| 19 | 2500 |
| 20 | 1000 |
| 28 | 2500 |
| 31 | 2500 |
| 32 | 1600 |
| 33 | 2500 |
| 34 | 2500 |
| 35 | 2500 |
| 36 | 2500 |
| 37 | 4000 |
| 38 | 2500 |
| 39 | 1600 |
| 40 | 2500 |
| 41 | 2500 |
| 42 | 2500 |
| 43 | 1000 |
| 58 | 1600 |
| 59 | 1600 |
| 60 | 1000 |

EXAMPLE 3

Electrophotographic recording materials were prepared by coating on a conductive layer as described in Example 3 a composition containing:

an organic photoconductor corresponding to the following formula:

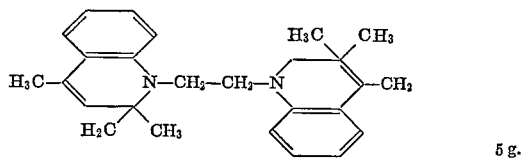

5 g.

copoly(vinyl chloride/vinyl acetate/maleic anhydride) (molar ratio 85.5/13.3/0.2)—5 g.
methylene chloride—45 ml.
1,2-dichloroethane—45 ml.
a sensitizing dye as listed in the table below—0.025 g.

The recording layers containing approximately 3 g. of photoconductor per sq. m. were charged with a negative corona having a potential difference of −6000 v. between the corona wires and the ground and contact-exposed with 100 lux sec. by means of a tungsten filament lamp.

The latent images were developed electrophoretically for 5 minutes as described in Example 2 with the difference that in the developer composition Shellsol T (trade name) was replaced by Isopar H (an isoparaffinic hydrocarbon mixture having a boiling range of 177–188° C. by Esso Belguim N.V., Antwerp, Belgium).

The relative speed values obtained are listed in the table below.

TABLE

| Sensitizing dye added: | Relative speed |
|---|---|
| — | 100 |
| 1 | 6000 |
| 2 | 4000 |
| 4 | 2500 |
| 5 | 1600 |
| 6 | 6000 |
| 7 | 6000 |
| 8 | 6000 |
| 9 | 2500 |
| 10 | 1600 |
| 13 | 4000 |
| 15 | 4000 |
| 19 | 2500 |
| 20 | 6000 |
| 31 | 1600 |
| 32 | 2500 |
| 33 | 2500 |
| 34 | 2500 |
| 35 | 600 |
| 36 | 2500 |
| 37 | 2500 |
| 38 | 2500 |
| 39 | 2500 |
| 40 | 2500 |
| 41 | 4000 |
| 42 | 2500 |
| 43 | 1600 |
| 58 | 2500 |
| 59 | 2500 |
| 60 | 2500 |

We claim:

1. A recording material comprising a photoconductive substance, whose photosensitivity is increased by a spectrally sensitizing dye which corresponds to the formula:

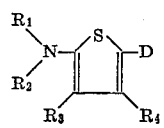

wherein:
each of $R_1$ and $R_2$ stands for $C_1$–$C_5$ alkyl or together represent the atoms necessary to complete a 5- or 6-membered heterocycle,
each of $R_3$ and $R_4$ stands for hydrogen, an alkyl group or an aryl group, and D represents a member selected from the group consisting of (1) 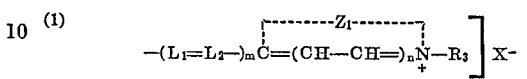

(2) 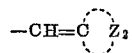

(3) 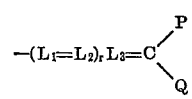

(4) 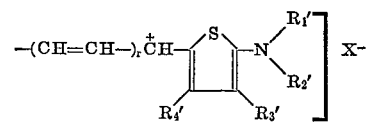

and (5) 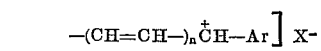

wherein:
each of $L_1$, $L_2$, and $L_3$ represents a methine group
$m$ represents 1 or 2,
$n$ represents 0 or 1,
$r$ represents 0, 1, or 2,
$R_5$ represents a saturated or unsaturated aliphatic group or an aromatic group,
$R_1'$, $R_2'$, $R_3'$, and $R_6'$ have one of the significances given for $R_1$, $R_2$, $R_3$, and $R_4$,
$Z_1$ stands for the non-metallic atoms necessary to complete a 5- or 6-membered heterocyclic nucleus containing nitrogen, which nucleus may carry a fused-on benzene or naphthalene ring,
$Z_2$ stands for the atoms necessary to complete a quaternary 1H-pyrrol-2-yl or 1H-pyrrol-3-yl group, which may carry a fused-on aromaitc ring, or a quaternary 1- or 3-indolizinyl group,
each of P and Q stands for an organic group, at least one of which is a negative group or P and Q together represent the atoms necessary to complete a heterocyclic ketomethylene nucleus,
Ar stands for an aryl group, and
X stands for an anion but does not exist when the dye molecule itself contains an anionic group, said dye being present in a sensitizing amount.

2. A recording material according to claim 1, wherein the said photoconductive substance is an inorganic photoconductor.

3. A recording material according to claim 2, wherein the said photoconductor is zinc oxide.

4. A recording material according to claim 1, wherein the said photoconductive substance is an organic photoconductor.

5. A recording material according to claim 1, wherein the said phtoconductive substance is an inorganic photoconductor and the spectrally sensitizing dye is used in an amount comprised between 0.01 mg. and 5 mg. per gram of inorganic photoconductor.

6. A recording material according to claim 1, wherein the said photoconductive substance is an organic photoconductor and the spectrally sensitizing dye is used in an amount comprised between 1 mg. and 100 mg. per gram of organic photoconductor.

7. A recording material according to claim 1 wherein $R_1$ and $R_2$ together with N complete the heterocyclic ring

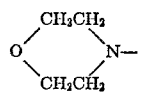

8. A recording material according to claim 7 wherein $R_3$ and $R_4$ are phenyl.

9. A recording material according to claim 7 wherein $R_3$ and $R_4$ are hydrogen.

10. A recording material according to claim 1 wherein $R_1$ and $R_2$ are each $CH_3-CH_2$.

11. A recording material according to claim 10 wherein $R_3$ and $R_4$ are phenyl.

12. A recording material according to claim 10 wherein $R_3$ and $R_4$ are hydrogen.

References Cited
UNITED STATES PATENTS

| | | | |
|---|---|---|---|
| 3,236,640 | 2/1966 | Tomanek et al. | 96—1.6 X |
| 3,615,399 | 10/1971 | Reynolds et al. | 96—1.7 X |
| 3,600,155 | 8/1971 | Williams et al. | 96—1.6 X |
| 3,687,946 | 8/1972 | Yao | 96—1.6 X |

NORMAN G. TORCHIN, Primary Examiner

J. R. MILLER, Assistant Examiner

U.S. Cl. X.R.

96—1.6; 260—240 R, 240 E, 240 F, 240.1, 240.4, 240.6, 240.65, 240.7, 240.9, 329 AM, 332.3 R

UNITED STATES PATENT OFFICE
CERTIFICATE OF CORRECTION

Patent No. 3,764,317                    Dated  October 9, 1973

Inventor(s)  Henri DEPOORTER ET AL

It is certified that error appears in the above-identified patent and that said Letters Patent are hereby corrected as shown below:

Column 2, line 3, "N-substituted 2-aminophene ring" should read -- N-substituted 2-aminothiophene ring --; Column 2, lines 28 - 30, formula (2), the formula should appear as follows:

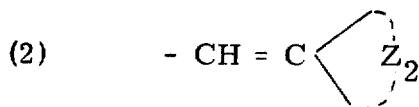

Column 2, line 41, after "or" insert -- (5) -- to designate the following formula. Column 3, line 10, "S-acetylsulphamyl)butyl" should read -- S-(acetylsulphamyl)butyl --. Column 4, line 75, "e.eg." should read -- e.g. --. Column 7, lines 11 - 20, formula (12), the formula should appear as follows:

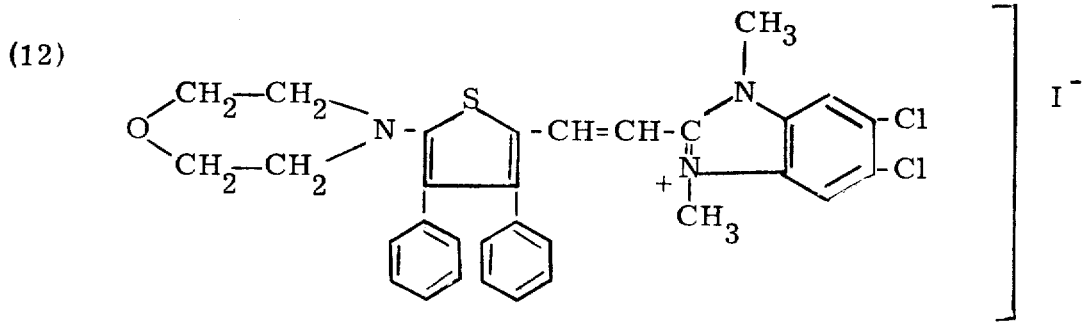

UNITED STATES PATENT OFFICE
CERTIFICATE OF CORRECTION

Patent No. 3,764,317　　　　　　　　　Dated October 9, 1973

Inventor(s) Henri DEPOORTER ET AL

It is certified that error appears in the above-identified patent and that said Letters Patent are hereby corrected as shown below:

Column 8, lines 1 - 10, formula (18), the formula should appear as follows (18)

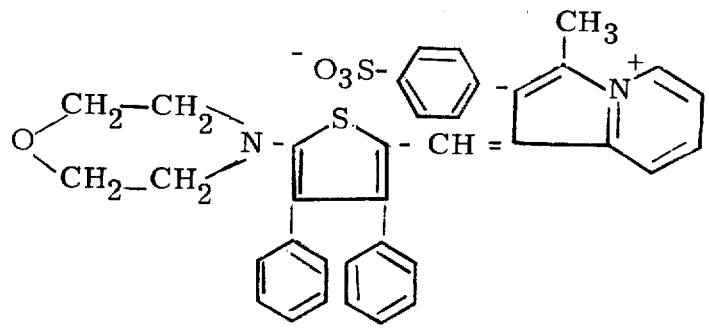

Column 9, lines 48 - 55, formula (28), the formula should appear as follows:

(28)

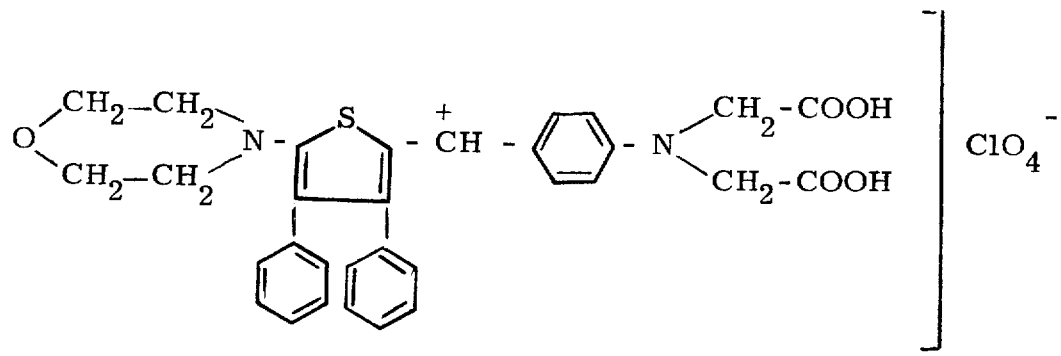

UNITED STATES PATENT OFFICE
CERTIFICATE OF CORRECTION

Patent No. 3,764,317  Dated October 9, 1973

Inventor(s) Henri DEPOORTER ET AL

It is certified that error appears in the above-identified patent and that said Letters Patent are hereby corrected as shown below:

Column 10, lines 34 - 42, formula (34), the formula should appear as follows:

(34)
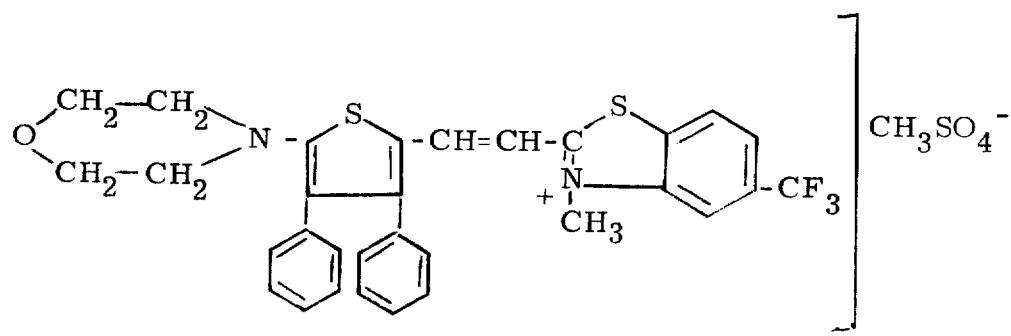

Column 11, lines 65 - 75, formula (44), the formula should appear as follows:

(44)
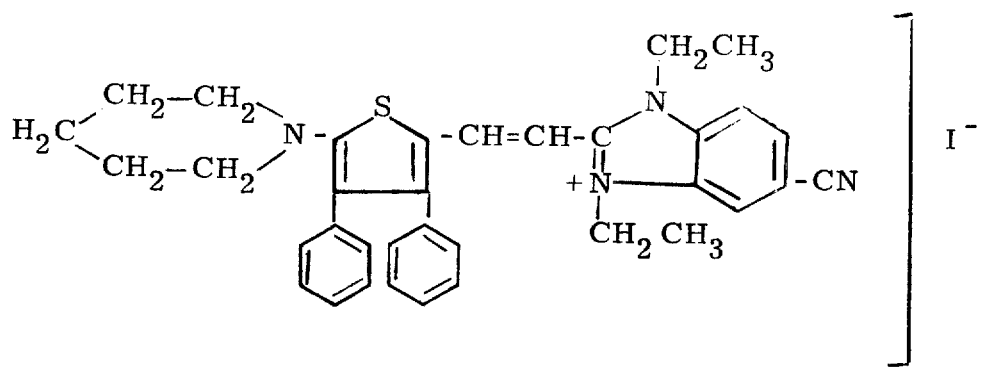

UNITED STATES PATENT OFFICE
CERTIFICATE OF CORRECTION

Patent No. 3,764,317          Dated October 9, 1973

Inventor(s) Henri DEPOORTER ETAL

It is certified that error appears in the above-identified patent and that said Letters Patent are hereby corrected as shown below:

Column 12, lines 10 - 20, formula (46), the formula should appear as follows:

(46)
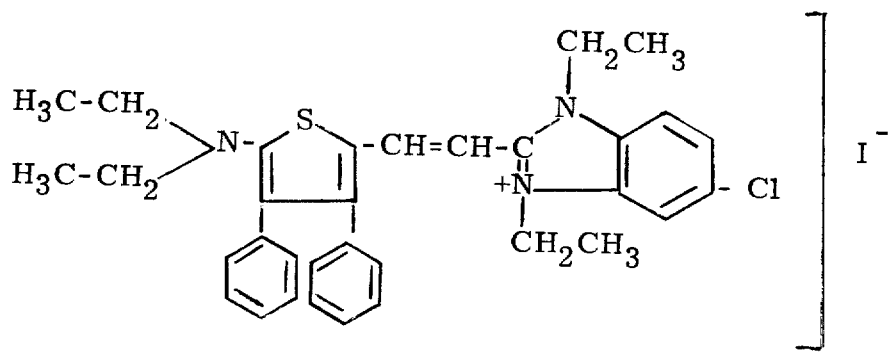

Column 12, lines 30 - 39, formula (48), to the right of the bracket, "⊢⊣" should read -- I⁻ --. Column 12, lines 51 - 59, formula (50), the formula should appear as follows:

(50)
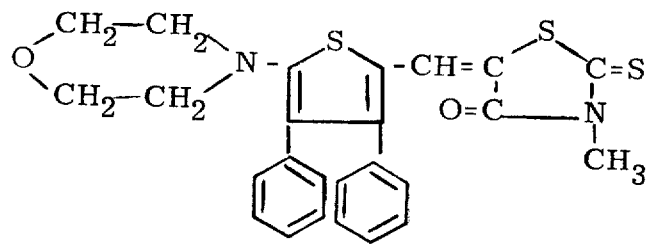

UNITED STATES PATENT OFFICE
CERTIFICATE OF CORRECTION

Patent No. 3,764,317   Dated October 9, 1973

Inventor(s) Henri DEPOORTER ET AL

It is certified that error appears in the above-identified patent and that said Letters Patent are hereby corrected as shown below:

Column 13, lines 10 - 18, following formula (53) before the formula, insert -- (54) --. Column 14, lines 18 - 20, formula (IV), the formula should appear as follows:

(IV)

Column 16, line 31, "ethylcelulose" should read -- ethylcellulose --.
Column 18, lines 20 - 25, the formula should appear as follows:

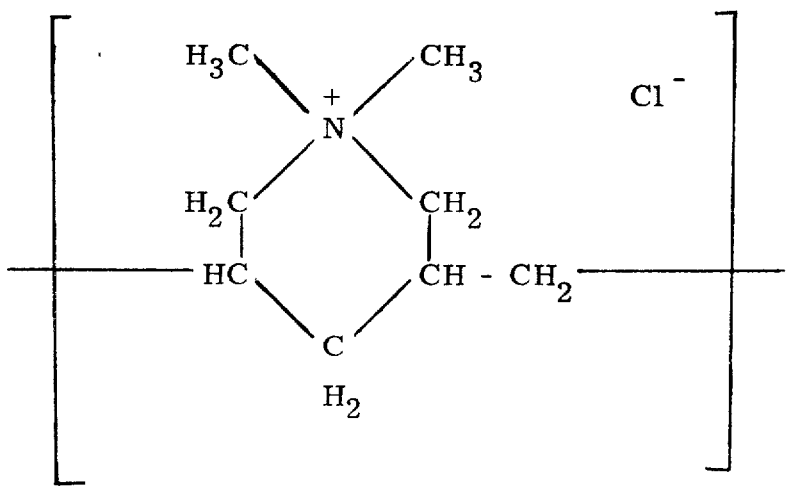

Column 20, line 26, "Germany" should read -- W. Germany --.

UNITED STATES PATENT OFFICE
CERTIFICATE OF CORRECTION

Patent No. 3,764,317                Dated    October 9, 1973

Inventor(s) Henri DEPOORTER ET AL

It is certified that error appears in the above-identified patent and that said Letters Patent are hereby corrected as shown below:

Column 21, lines 7 - 14, the formula should appear as follows:

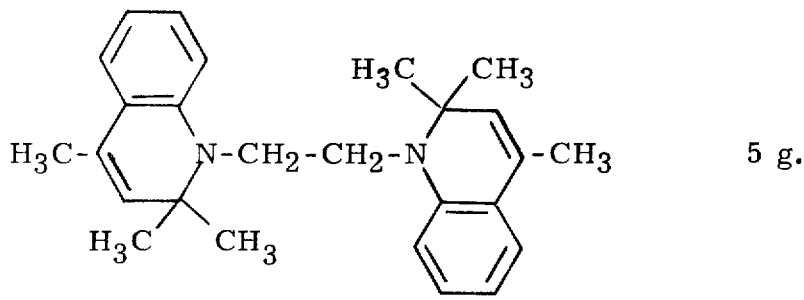       5 g.

Column 22, claim 1, lines 9 - 10, formula (1), the formula should appear as follows:

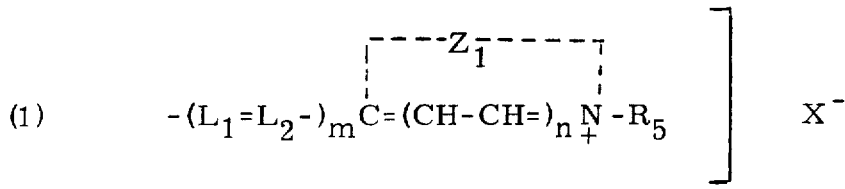

Column 22, line 40, claim 1, "$R_6'$" should read -- $R_4'$ --; Column 22, line 67, claim 5, "phtoconductive" should read -- photoconductive --.

Signed and sealed this 17th day of September 1974.

(SEAL)
Attest:

McCOY M. GIBSON JR.                C. MARSHALL DANN
Attesting Officer                  Commissioner of Patents